(12) United States Patent
Ono

(10) Patent No.: US 11,418,671 B2
(45) Date of Patent: Aug. 16, 2022

(54) INFORMATION PROCESSING APPARATUS, AND METHOD OF CONTROLLING THE SAME

(71) Applicant: CANON KABUSHIKI KAISHA, Tokyo (JP)

(72) Inventor: Shinichi Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 16/569,869

(22) Filed: Sep. 13, 2019

(65) Prior Publication Data

US 2020/0099815 A1 Mar. 26, 2020

(30) Foreign Application Priority Data

Sep. 20, 2018 (JP) .............................. JP2018-176151

(51) Int. Cl.
| | | |
|---|---|---|
| G06F 21/57 | (2013.01) | |
| H04N 1/00 | (2006.01) | |
| H04L 9/32 | (2006.01) | |
| G06F 13/42 | (2006.01) | |
| G06F 11/14 | (2006.01) | |

(52) U.S. Cl.
CPC ..... *H04N 1/00928* (2013.01); *G06F 11/1417* (2013.01); *G06F 13/4282* (2013.01); *G06F 21/572* (2013.01); *G06F 21/575* (2013.01); *H04L 9/3236* (2013.01); *H04N 1/00896* (2013.01); *H04N 1/00925* (2013.01); *G06F 2221/033* (2013.01); *H04N 2201/0094* (2013.01)

(58) Field of Classification Search
CPC .............................. G06F 21/572; G06F 21/575
See application file for complete search history.

(56) References Cited

U.S. PATENT DOCUMENTS

| 8,745,428 | B2 | 6/2014 | Matsui | |
|---|---|---|---|---|
| 9,244,692 | B2 | 1/2016 | Matsui | |
| 2005/0138409 | A1* | 6/2005 | Sheriff | G06F 21/575 |
| | | | | 726/26 |
| 2006/0155988 | A1* | 7/2006 | Hunter | G06F 21/575 |
| | | | | 713/164 |
| 2007/0300207 | A1* | 12/2007 | Booth | G06F 21/575 |
| | | | | 717/126 |
| 2010/0332797 | A1 | 12/2010 | Matsui | |
| 2014/0237225 | A1 | 8/2014 | Matsui | |

FOREIGN PATENT DOCUMENTS

| JP | 2000-322254 A | 11/2000 |
|---|---|---|
| JP | 2011-013775 A | 1/2011 |
| JP | 2014-056390 A | 3/2014 |

OTHER PUBLICATIONS

Japanese Office Action dated May 6, 2022 in counterpart Japanese Patent Appln. No. 2018-176151.

* cited by examiner

*Primary Examiner* — Gary Collins
(74) *Attorney, Agent, or Firm* — Venable LLP

(57) ABSTRACT

An information processing apparatus includes a storage unit in which a boot program is stored, a first control unit and a second control unit. The first control unit validates the boot program stored in the storage unit and transmits a pattern signal indicating that the boot program stored in the storage unit is validated. The second control unit executes the boot program stored in the storage unit in accordance with the pattern signal received from the first control unit.

20 Claims, 4 Drawing Sheets

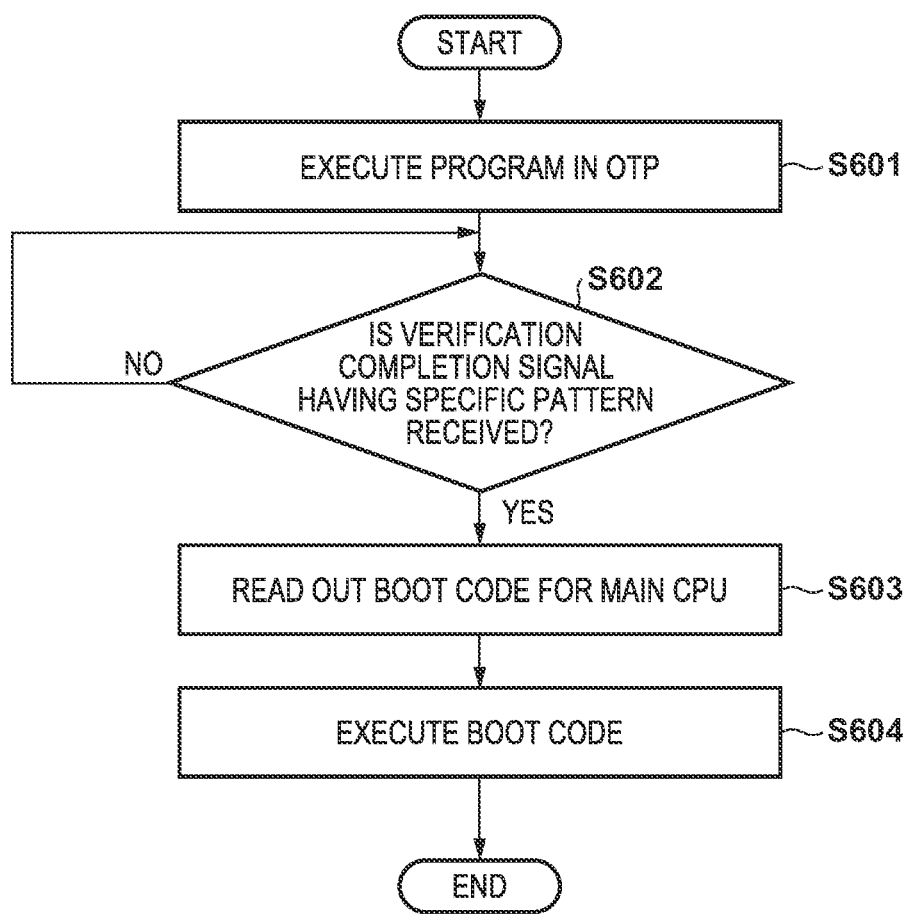

INFORMATION PROCESSING APPARATUS, AND METHOD OF CONTROLLING THE SAME

BACKGROUND OF THE INVENTION

Field of the Invention

The present invention relates to an information processing apparatus, and a method of controlling the same.

Description of the Related Art

In recent years, in an information processing apparatus such as a multi-function peripheral (MFP), a mechanism (alteration detection function) for checking alteration of software included in a system at the time of activation of the system and not operating the software that is likely to have been altered is being introduced. For example, a boot code (boot program) executed by a main CPU is read out by a sub CPU before the activation of the main CPU, and the sub CPU verifies whether the read boot code has been altered. If the alteration of the boot code is detected, it is desirable not to activate the main CPU in order to prevent the main CPU from executing the altered boot code.

In order not to activate the main CPU, for example, there is a method of controlling a reset signal input to the main CPU to keep the main CPU in a reset state. Further, Japanese Patent Laid-Open No. 2011-13775 describes a method of causing the main CPU to transition to an interrupt wait state as soon as the activation of the main CPU is completed. In this method, when the sub CPU is activated and transmits an interrupt signal to the main CPU, the main CPU recovers from the interrupt wait state and can execute subsequent processing.

However, in a case of keeping the main CPU in the reset state by controlling the reset signal output from the sub CPU to the main CPU, there is a possibility that the reset state of the main CPU is released inappropriately due to the following factors. For example, when a solder bridge has been generated on a reset signal output terminal in the sub CPU at the time of mounting a substrate, when dust has adhered to the terminal, or when a failure has occurred in the sub CPU itself, a correct reset signal is not output from the sub CPU to the main CPU. As a result, if the reset state of the main CPU is released by an incorrect reset signal, the main CPU may execute the altered boot code without waiting for the completion of the verification of the boot code by the sub CPU.

Moreover, the wiring for a reset signal from the sub CPU to the main CPU may be intentionally modified by a malicious third party, and a ROM in which a valid boot code is written may be replaced with a ROM in which an invalid boot code is written. In this case, the main CPU executes the invalid boot code without waiting for the completion of the verification of the boot code, so that the image processing apparatus may execute unexpected processing.

SUMMARY OF THE INVENTION

The present invention provides a technique for, at the time of activation of an information processing apparatus, preventing a main CPU from executing a boot program before the completion of the verification of the boot program by a sub CPU.

According to one aspect of the present invention, there is provided an information processing apparatus comprising: a storage unit in which a boot program is stored; a first control unit configured to validate the boot program stored in the storage unit and transmit a pattern signal indicating that the boot program stored in the storage unit is validated; and a second control unit configured to execute the boot program stored in the storage unit in accordance with the pattern signal received from the first control unit.

According to another aspect of the present invention, there is provided a method of controlling an information processing apparatus that comprises a storage unit in which a boot program is stored, a first control unit and a second control unit, the method comprising: the first control unit validating the boot program stored in the storage unit and transmitting a pattern signal indicating that the boot program stored in the storage unit is validated; and the second control unit executing the boot program stored in the storage unit in accordance with the pattern signal received from the first control unit.

Further features of the present invention will become apparent from the following description of exemplary embodiments (with reference to the attached drawings).

BRIEF DESCRIPTION OF THE DRAWINGS

FIG. 6 is a flowchart illustrating the procedure of a process executed by the main CPU.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Arrangement of MFP>

Figure 1:
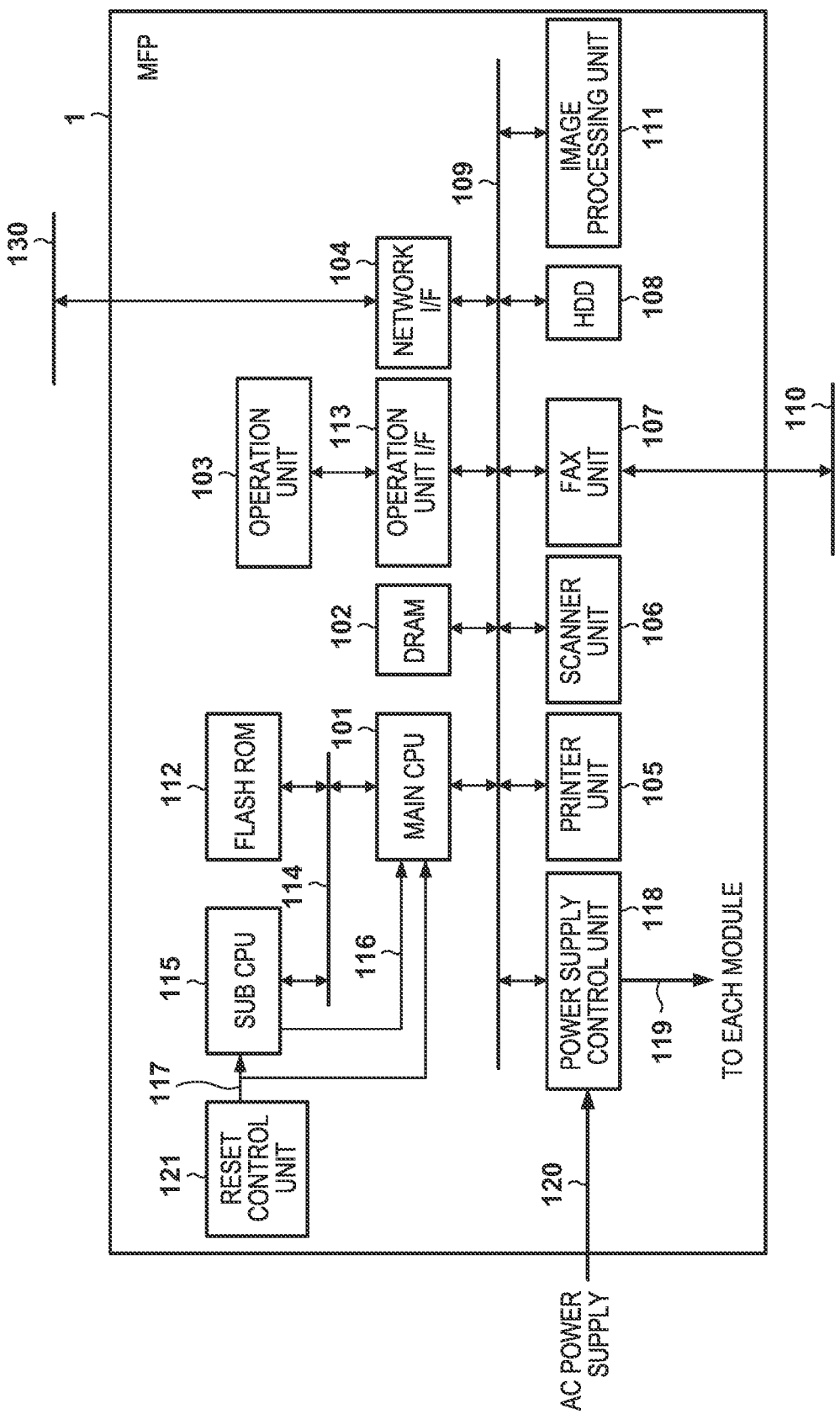
FIG. 1 is a block diagram showing an example of the hardware arrangement of an MFP.

FIG. 1 is a block diagram showing an example of the hardware arrangement of a multi-function peripheral (MFP) which is an image processing apparatus according to an embodiment of the present invention. This embodiment exemplifies a case in which, as an example of an information processing apparatus, the present invention is applied to an MFP which is an image processing apparatus (image forming apparatus) that includes a main CPU and a sub CPU and performs image processing. Note that the present invention is applicable to an information processing apparatus including a main CPU and a sub CPU, so that it is also applicable to, for example, a printing apparatus, a reading apparatus, a copying machine, a facsimile apparatus, and the like.

An MFP 1 according to the present embodiment includes a main CPU (Central Processing Unit) 101, a DRAM (Dynamic Random Access Memory) 102, and an operation unit I/F (interface) 113. The MFP 1 further includes a network OF 104, a printer unit 105, a scanner unit 106, a FAX (facsimile) unit 107, an HDD (Hard Disk Drive) 108, an image processing unit 111, and a power supply control unit 118. These devices are connected to a signal bus 109 and can communicate with each other via the signal bus 109. The MFP 1 further includes an operation unit 103, a flash ROM (Read Only Memory) 112, a sub CPU 115, and a reset control unit 121. The main CPU 101, the flash ROM 112, and the sub CPU 115 are connected to an SPI (Serial Peripheral Interface) bus 114 and can communicate with each other via the SPI bus 114.

The main CPU 101 controls the overall MFP 1. The DRAM 102 stores programs executed by the main CPU 101, and is also used as a work area for temporary data. The operation unit 103 is connected to the signal bus 109 via the operation unit I/F 113. The operation unit 103 receives an operation by a user, and notifies the main CPU 101 of the received operation via the operation unit I/F 113.

The HDD 108 stores programs executed by the main CPU 101, and is also used as a spool area for a job such as a print job or scan job. The HDD 108 is also used to store image data of a scan image or the like. The flash ROM 112 is a non-volatile memory (storage device) that stores programs including a boot code (boot program) executed by the main CPU 101 and also stores default setting values of the MFP 1.

The network I/F 104 is connected to a LAN 130 and communicates with an external apparatus via the LAN 130. For example, the network I/F 104 receives a print job transmitted from the external apparatus. The printer unit 105 forms (prints) an image on a print medium such as a sheet based on input image data. The scanner unit 106 optically reads the image of a document and converts it into an electrical signal, thereby generating the image data of a scan image. The FAX (facsimile) unit 107 is connected to a public line 110 and performs FAX communication with an external apparatus via the public line 110.

The image processing unit 111 converts image data used for printing by the printer unit 105 into an image suitable for printing by the printer unit 105. The image processing unit 111 also performs image processing such as noise removal, color space conversion, rotation, or compression on image data generated by the scanner unit 106 or stored in the HDD 108.

When the MFP 1 is activated, the sub CPU 115 reads out the boot code from the flash ROM 112 before the activation of the main CPU 101 is completed, and executes verification processing for verifying the validity of the read boot code (that is, whether the boot code has been altered). With this verification processing, it is possible to detect the alteration of the boot code. The sub CPU 115 outputs a verification completion signal 116 indicating the verification result of the boot code to the main CPU 101.

The alteration detection method used by the sub CPU 115 is, for example, as follows. First, at the time of the manufacture of the MFP 1, the public key information of the digital signature of the boot code (encrypted information obtained by performing public key encryption on the hash value of the boot code) is stored in an OTP (One Time Program) area 204 (FIG. 2) in the sub CPU 115. The sub CPU 115 uses the encrypted information stored in the OTP area 204 to verify whether or not the boot code read out from the flash ROM 112 has been altered (the validity of the boot code). Note that RSA2048, ECDSA, or the like can be used as a public key encryption method.

The power supply control unit 118 is supplied with power from a commercial AC power supply via a power supply line 120. The power supply control unit 118 controls the power supply to the respective modules in the MFP 1 via a power supply line 119.

The reset control unit 121 controls the operation state of each of the main CPU 101 and the sub CPU 115 between a reset state and a reset release state using a reset signal 117 output to the main CPU 101 and the sub CPU 115. If the reset signal 117 is at L (low) level, each of the main CPU 101 and the sub CPU 115 enters the reset state. If the reset signal 117 is at H (high) level, each of the main CPU 101 and the sub CPU 115 enters the reset release state.

If a predetermined time has elapsed after the supplied power supply voltage exceeds a predetermined voltage, the reset control unit 121 causes the reset signal 117 output to the main CPU 101 and the sub CPU 115 to transition from L level to H level. With this process, the reset control unit 121 releases the reset state of each of the main CPU 101 and the sub CPU 115. That is, if the MFP 1 is activated from a power-off state, the reset control unit 121 releases the reset state of each of the main CPU 101 and the sub CPU 115 using the reset signal 117.

Note that in the present embodiment, the main CPU 101 functions as an example of a second control unit, and the sub CPU 115 functions as an example of a first control unit. The reset control unit 121 functions as an example of a reset unit configured to reset the second control unit and release a reset of the second control unit <Arrangement of Main CPU>

Figure 2:
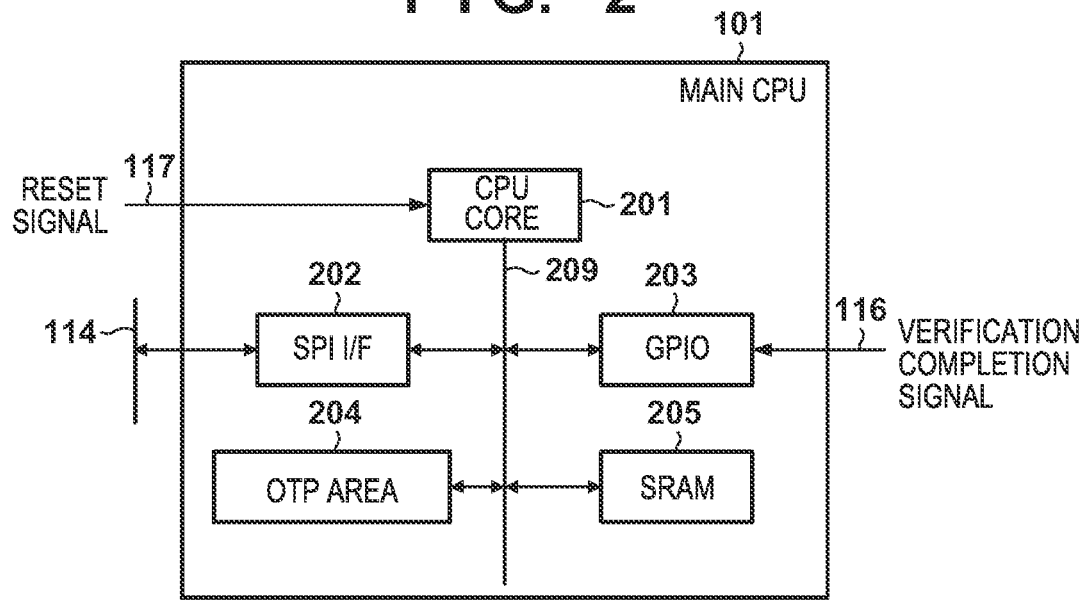
FIG. 2 is a block diagram showing an example of the hardware arrangement of a main CPU.

FIG. 2 is a block diagram showing an example of the hardware arrangement of the main CPU 101. The main CPU 101 includes a CPU core 201, an SPI I/F 202, a GPIO (General-Purpose Input/Output) 203, the OTP area 204, and an SRAM 205 as modules connected to a signal bus 209.

The CPU core 201 performs the basic function of the CPU. The SPI I/F 202 is connected to the SPI bus 114, and reads and writes data from and to an external SPI device via the SPI bus 114. The GPIO 203 is communicably connected to an external device, and transmits and receives data to and from the external device. For example, the GPIO 203 receives the verification completion signal 116 transmitted from the sub CPU 115.

The OTP area 204 is a memory area in which a program can be written only once and cannot be rewritten. After a program is written in the OTP area 204, it can never be rewritten. In the OTP area 204, a program to be executed first after the MFP 1 is activated from a power-off state is stored in advance. This program is written in the OTP area 204 at the time of the manufacture of the MFP 1. The SRAM 205 is used as a work memory in the main CPU 101.

The reset signal 117 output from the reset control unit 121 is input to the CPU core 201 via the reset terminal of the main CPU 101. In a case where the reset signal 117 is at L level, the main CPU 101 enters the reset state. In a case where the reset signal 117 is at H level, the main CPU 101 enters the reset release state. If the reset signal 117 transitions from L level to H level (that is, the main CPU 101 transitions from the reset state to the reset release state), the CPU core 201 first reads out and executes the program stored in the OTP area 204. That is, when the MFP 1 is activated, the CPU core 201 first executes the program stored in the OTP area 204.

<Arrangement of Sub CPU>

Figure 3:
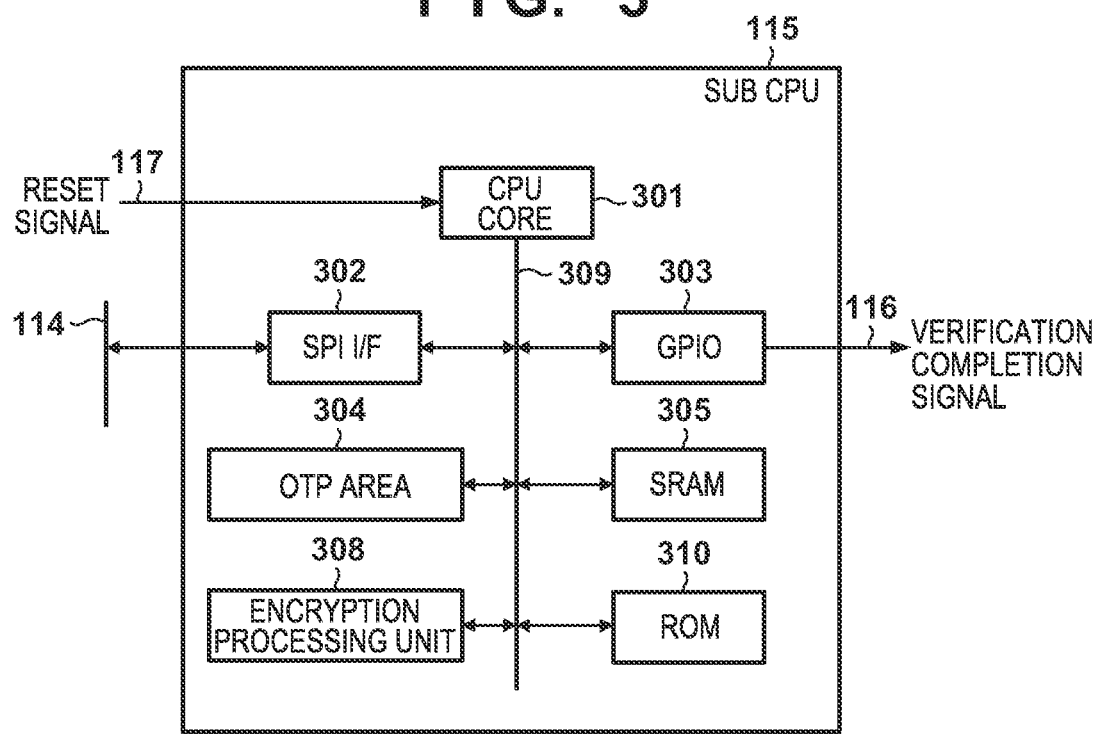
FIG. 3 is a block diagram showing an example of the hardware arrangement of a sub CPU.

FIG. 3 is a block diagram showing an example of the hardware arrangement of the sub CPU 115. The sub CPU 115 includes a CPU core 301, an SPI I/F 302, a GPIO 303, an OTP area 304, an SRAM 305, an encryption processing unit 308, and a ROM 310 as modules connected to a signal bus 309.

The CPU core 301 performs the basic function of the CPU. The SPI I/F 302 is connected to the SPI bus 114, and reads and writes data from and to an external SPI device via the SPI bus 114. The GPIO 303 is communicably connected to an external device, and transmits and receives data to and from the external device. For example, the GPIO 303 transmits, to the main CPU 101, the verification completion signal 116 indicating the verification result of the boot code read out from the flash ROM 112.

The OTP area 304 is a memory area in which a program can be written only once and cannot be rewritten. After a program is written in the OTP area 304, it can never be rewritten. In the OTP area 304, encrypted information obtained by performing public key encryption on the hash value of the boot code is stored in advance. The encrypted information is written in the OTP area 304 at the time of the manufacture of the MFP 1. The SRAM 305 is used as a work memory in the sub CPU 115.

The encryption processing unit 308 decrypts the encrypted information stored in the OTP area 304, and restores the hash value of the boot code. The ROM 310 stores the boot code for the sub CPU 115.

The reset signal 117 output from the reset control unit 121 is input to the CPU core 301 via the reset terminal of the sub CPU 115. In a case where the reset signal 117 is at L level, the sub CPU 115 enters the reset state. In a case where the reset signal 117 is at H level, the sub CPU 115 enters the reset release state. If the reset signal 117 transitions from L level to H level (that is, the sub CPU 115 transitions from the reset state to the reset release state), the CPU core 301 first reads out and executes the boot code for the sub CPU 115 stored in the ROM 310.

Then, the CPU core 301 reads out the boot code for the main CPU 101 stored in the flash ROM 112 via the SPI I/F 302, and calculates the hash value of the boot code. Further, the CPU core 301 decrypts the encrypted information stored in the OTP area 304 using the encryption processing unit 308 to restore the hash value of the boot code. The CPU core 301 compares the hash value obtained by decrypting the encrypted information stored in the OTP area 304 with the hash value of the boot code read out from the flash ROM 112 to verify whether or not the boot code has been altered. The CPU core 301 notifies the main CPU 101 of the verification result as the verification completion signal 116 via the GPIO 303.

<Verification Completion Signal>

Figure 4:
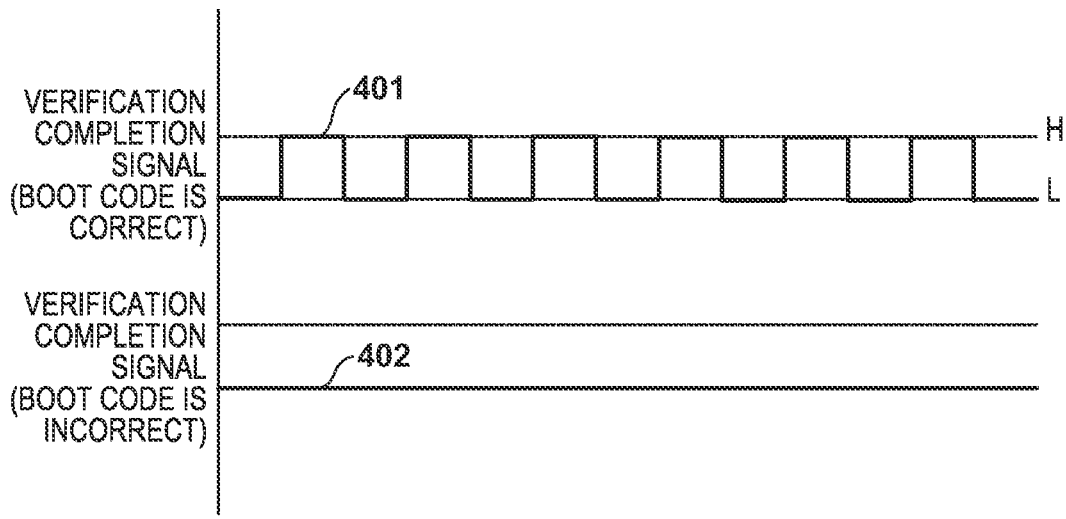
FIG. 4 is a chart showing an example of the signal waveforms of a verification completion signal.

FIG. 4 is a chart showing an example of the signal waveforms of the verification completion signal 116 output by the sub CPU 115. A signal waveform 401 is the waveform of a signal output in a case where a verification result indicating that the boot code is correct (has not been altered) is obtained. A signal waveform 402 is the waveform of a signal output in a case where a verification result indicating that the boot code is incorrect (has been altered) is obtained.

In the present embodiment, if a verification result indicating that the boot code is correct is obtained, the sub CPU 115 outputs, as the verification completion signal 116, the signal waveform 401 which repeats H level and L level a predetermined number of times in a predetermined period. On the other hand, if a verification result indicating that the boot code is incorrect is obtained, the sub CPU 115 outputs, as the verification completion signal 116, the signal waveform 402 which is constant at a certain level.

The period of the verification completion signal 116 needs to be set to a period (sampling period) in which the main CPU 101 can sample the signal input to the GPIO 203. According to the sampling theorem, the period of the verification completion signal 116 output from the sub CPU 115 needs to be set to twice or more (approximately 10 times in practice taking into account an error or the like) the sampling period of the main CPU 101. For example, in a case where the sampling period of the main CPU 101 is 1 ms, the period of the verification completion signal 116 is set to 10 ms.

As described above, if a verification result indicating that the boot code is correct is obtained as a result of the boot code verification processing, the sub CPU 115 transmits (outputs) a signal having a specific pattern as the verification completion signal 116 to the main CPU 101. Thus, the sub CPU 115 notifies the main CPU 101 that the verification result indicating that the boot code is correct is obtained. Note that in the example shown in FIG. 4, a pattern in which H level and L level are simply repeated is shown as the signal waveform 401 of the verification completion signal 116, but a more complicated pattern may be used. The more complicated the pattern of the signal waveform 401, the lower the possibility that the verification completion signal 116 itself is altered.

<Process of Sub CPU>

Figure 5:
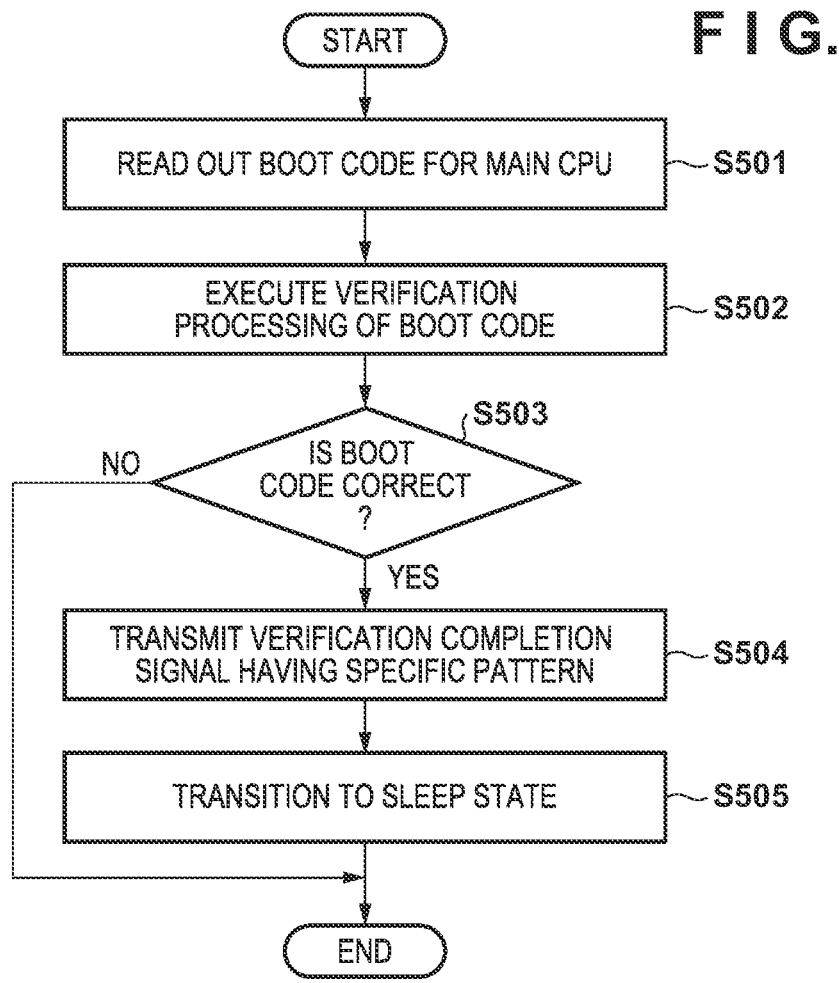
FIG. 5 is a flowchart illustrating the procedure of a process executed by the sub CPU.

FIG. 5 is a flowchart illustrating the procedure of a process executed by the sub CPU 115. When the MFP 1 is activated from the power-off state and the reset state is released in accordance with the reset signal 117 output from the reset control unit 121, the sub CPU 115 executes the process according to the procedure illustrated in FIG. 5.

First, in step S501, the sub CPU 115 (CPU core 301) reads out the boot code for the main CPU 101 from the flash ROM 112 via the SPI bus 114. Then, in step S502, the sub CPU 115 executes verification processing of the boot code (processing for verifying the validity of the boot code) read out from the flash ROM 112. Thus, if the reset state is released by the reset control unit 121, the sub CPU 115 starts verification of the boot code stored in the flash ROM 112.

In step S503, the sub CPU 115 determines, based on the result of the verification processing in step S502, whether or not the boot code is correct. If the boot code is incorrect (invalid), the sub CPU 115 terminates the process. If the boot code is incorrect, the sub CPU 115 may notify of the alteration of the boot code. For example, the sub CPU 115 may turn on an LED (not shown) on a substrate arranged in the MFP 1 or may notify of the alteration of the boot code by causing the operation unit 103 to display an error message. On the other hand, if the boot code is correct (valid), the sub CPU 115 advances the process to step S504.

In step S504, the sub CPU 115 transmits the verification completion signal 116 having a specific pattern (exemplified as the signal waveform 401 in FIG. 4) to the main CPU 101 via the GPIO 303. In this manner, if the boot code stored in the flash ROM 112 is valid as a result of the verification processing in step S502, the sub CPU 115 transmits the verification completion signal 116 having the specific pattern to the main CPU 101. Thereafter, in step S505, the sub CPU 115 transitions to a sleep state (power saving state) in order to reduce power consumption, thereby terminating the process.

<Process of Main CPU>

FIG. 6 is a flowchart illustrating the procedure of a process executed by the main CPU 101. If the MFP 1 is activated from the power-off state and the reset state is released in accordance with the reset signal 117 output from the reset control unit 121, the main CPU 101 executes the process according to the procedure illustrated in FIG. 6.

First, in step S601, the main CPU 101 executes the program stored in the OTP area 204. This program is a program for executing processing of step S602 when the reset state of the main CPU 101 is released. Thus, if the reset state is released by the reset control unit 121, the main CPU 101 starts execution of the program stored in the OTP area 204.

Next, in step S602, the main CPU 101 determines whether or not the verification completion signal 116 having a specific pattern (exemplified as the signal waveform 401 in FIG. 4) is received from the sub CPU 115. Based on the determination, the main CPU 101 waits until receiving a signal having the specific pattern as the verification completion signal 116 from the sub CPU 115. That is, when the MFP 1 is activated, the main CPU 101 executes the program stored in the OTP area 204, thereby transitioning to a state of waiting for the reception of the verification completion signal 116. If a signal having the specific pattern is received as the verification completion signal 116, the main CPU 101 advances the process to step S603.

In step S603, the main CPU 101 reads out the boot code, that has been verified to be correct, from the flash ROM 112. Furthermore, in step S604, the main CPU 101 executes the read boot code. In this manner, if a signal having the specific pattern is received from the sub CPU 115, the main CPU 101 executes the boot code stored in the flash ROM 112. Thereafter, the main CPU 101 terminates the process according to the procedure shown in FIG. 6.

As described above, in the present embodiment, when the MFP 1 is activated, the main CPU 101 executes the program stored in the OTP area 204. With this process, the main CPU 101 transitions to a state of waiting for the reception of a signal indicating the verification result of the boot code (boot program) stored in the flash ROM 112. The sub CPU 115 verifies the validity of the boot code stored in the flash ROM 112, and transmits the verification completion signal 116 indicating the result of the verification to the main CPU 101. If the verification completion signal 116 is received from the sub CPU 115, the main CPU 101 executes the boot code stored in the flash ROM 112.

In this manner, the main CPU 101 first executes the program stored in the OTP area 204 after the reset state is released at the time of activation of the MFP 1, thereby transitioning to a state of waiting for the reception of the verification completion signal 116. If the verification completion signal 116 transmitted from the sub CPU 115 after the completion of the verification of the boot code is received, the main CPU 101 executes the boot code stored in the flash ROM 112. That is, the main CPU 101 does not start execution of the boot code in accordance with the release of the reset state, but starts execution of the boot code if the verification completion signal 116 is received after the reset state is released.

With this process, even if an incorrect reset signal is input to the main CPU 101, it is possible to prevent the main CPU 101 from executing the boot code before the completion of the verification of the boot code by the sub CPU 115. Therefore, it is possible to prevent the main CPU from executing an invalid boot code without waiting for the completion of the verification of the boot code, in a case where, for example, dust has adhered to a reset signal output terminal in the sub CPU or a failure has occurred in the sub CPU itself. Moreover, even if the wiring for a reset signal from the sub CPU to the main CPU is intentionally modified, it is possible to prevent the main CPU from executing an invalid boot code.

Note that in the above-described embodiment, unidirectional signal transmission from the sub CPU 115 to the main CPU 101 is exemplified. In this regard, the main CPU 101 that has received the verification completion signal 116 may transmit a reception confirmation signal to the sub CPU 115, and the sub CPU 115 may transmit the verification completion signal 116 to the main CPU 101 again in response to the reception confirmation signal. In this case, the main CPU 101 may read out and execute the boot code from the flash ROM 112 in a case where the verification completion signal 116 is received again. This makes it possible to improve the reliability of control of the main CPU 101 using the verification completion signal 116.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-176151, filed Sep. 20, 2018, which is hereby incorporated by reference herein in its entirety.

What is claimed is:

1. An information processing apparatus comprising:
   a storage unit in which a boot program is stored;
   a first control unit configured to, upon release of a reset state of the first control unit, validate the boot program stored in the storage unit and transmit a pattern signal indicating that the boot program stored in the storage unit is validated; and
   a second control unit configured to, upon release of a reset state of the second control unit, transition to a state of waiting for reception of the pattern signal, and start execution of the boot program stored in the storage unit in accordance with reception of the pattern signal from the first control unit.

2. The apparatus according to claim 1, wherein the pattern signal is a signal combining one or more high levels and one or more low levels.

3. The apparatus according to claim 1, wherein
   the second control unit includes a non-rewritable memory area in which a program is stored, and upon release of the reset state of the second control unit, the second control unit transitions to the state of waiting for reception of the pattern signal by executing the program stored in the non-rewritable memory area and then starts execution of the boot program stored in the storage unit in accordance with reception of the pattern signal from the first control unit.

4. The apparatus according to claim 3, wherein the program stored in the non-rewritable memory area is executed first by the second control unit after the apparatus is activated from a power-off state.

5. The apparatus according to claim 1, wherein the first control unit notifies of error of the boot program if the boot program stored in the storage unit is not validated.

6. The apparatus according to claim 1, wherein the second control unit transmits a reception confirmation signal to the first control unit in accordance with reception of another pattern signal indicating that the boot program stored in the storage unit is validated, and executes the boot program in accordance with reception of the pattern signal as response of the reception confirmation signal.

7. The apparatus according to claim 1, further comprising:
a reset unit configured to reset the second control unit and, if the apparatus is activated from a power-off state, release the reset state of the second control unit.

8. The apparatus according to claim 7, wherein the reset unit is further configured to reset the first control unit and, if the apparatus is activated from the power-off state, release the reset state of the first control unit.

9. The apparatus according to claim 1, further comprising:
a memory in which encrypted information obtained from the boot program is stored in advance,
wherein the first control unit validates the boot program by comparing a hash value obtained by decrypting the encrypted information stored in the memory with a hash value of the boot program stored in the storage unit.

10. The apparatus according to claim 1, wherein the first control unit transitions to a power saving state after transmitting the pattern signal to the second control unit.

11. The apparatus according to claim 1, wherein the first control unit accesses the boot program stored in the storage unit via a first interface and transmits the pattern signal to the second control unit via a second interface.

12. The apparatus according to claim 11, wherein the first interface is a SPI (Serial Peripheral Interface) interface.

13. The apparatus according to claim 11, wherein the second interface is a GPIO (General-purpose input/output).

14. The apparatus according to claim 1, further comprising:
a printing unit configured to print image.

15. The apparatus according to claim 1, further comprising:
a scanner unit configured to scan image.

16. A method of controlling an information processing apparatus that comprises a storage unit in which a boot program is stored, a first control unit and a second control unit, the method comprising:
upon release of a reset state of the first control unit, the first control unit validating the boot program stored in the storage unit and transmitting a pattern signal indicating that the boot program stored in the storage unit is validated;
upon release of a reset state of the second control unit, the second control unit transitioning to a state of waiting for reception of the pattern signal; and
the second control unit starting execution of the boot program stored in the storage unit in accordance with reception of the pattern signal from the first control unit.

17. The method according to claim 16, wherein
the pattern signal is a signal combining one or more high levels and one or more low levels.

18. The method according to claim 16, wherein
the second control unit includes a non-rewritable memory area in which a program is stored, and
upon release of the reset state of the second control unit, the second control unit transitions to the state of waiting for reception of the pattern signal by executing the program stored in the non-rewritable memory area and then starts execution of the boot program stored in the storage unit in accordance with reception of the pattern signal from the first control unit.

19. The method according to claim 16, further comprising:
the first control unit notifying of error of the boot program if the boot program stored in the storage unit is not validated.

20. The method according to claim 16, wherein
the information processing apparatus further comprises a memory in which encrypted information obtained from the boot program is stored in advance, and
the boot program is validated by comparing a hash value obtained by decrypting the encrypted information stored in the memory with a hash value of the boot program stored in the storage unit.

\* \* \* \* \*